Patented Nov. 30, 1943

2,335,539

UNITED STATES PATENT OFFICE 2,335,539

DISAZO PIGMENTS AND METHOD OF PRODUCING

William B. Reynolds, Cincinnati, Ohio, assignor to Interchemical Corporation, New York, N. Y., a corporation of Ohio No Drawing. Application November 14, 1942, Serial No. 465,631

2 Claims. (Cl. 260—148)

This invention relates to disazo pigments, and has particular reference to new pigments characterized by cleanliness of tone combined with fastness to light and resistance to bleeding in organic solvents. Specifically, this invention relates to the coppery complexes obtainable from the couplings of beta oxy naphthoic acid with certain tetrazotized primary aromatic diamines.

There has been considerable demand, particularly in the field of pigment printing on textiles, for pigments which would combine the features of brilliance of tone, fastness to light, and resistance to solvents such as acetone, while showing extremely good resistance to water and dilute soap solutions. In particular, acceptable browns and violets have been difficult to obtain unless insoluble vat dyestuffs are used.

In my co-pending application Serial Number 340,046, filed June 12, 1940, of which this is a continuation in part, I have disclosed the invention of certain azo pigments which combine cleanliness of color with lightfastness, wash-resistance and insolubility in organic solvents. These pigments comprise the coppered complexes of the couplings of beta oxy naphthoic acid with tetrazotized primary aromatic diamines of the general formula:

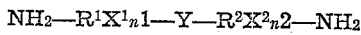

where $R^1$ and $R^2$ are benzene or naphthalene nuclei, $X^1$ and $X^2$ are substituents of the group consisting of hydrogen, alkyl, alkoxy, halogen and nitro, $n^1$ and $n^2$ are numbers from 1 to 3, and Y is a bond, oxygen, carbonyl or alkyl. In that application, it was also disclosed that $X_1$ and $X_2$ could be aryl and aralkyl, although no specific examples of this class of substituents were therein disclosed.

This disclosure is directed to azo pigments of the above class, of the general formula:

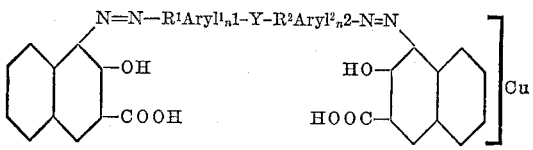

where $R^1$ and $R^2$ are benzene or naphthalene nuclei, $n^1$ and $n^2$ are numbers from 1 to 3, and Y is a bond, oxygen, carbonyl or alkyl.

Typical amines which can be used are 3,3'-diphenyl benzidine, 3,3'-diphenyl-4,4'-diamino diphenyl ether; 3,3'-diphenyl-4,4'-diamino benzophenone; 3,3'-diphenyl-4,4'-diamino diphenyl methane; 3,3'-diphenyl-4,4'-diamino-1,1'-binaphthyl, and certain derivatives of the above types containing substituents of the type alkyl, alkoxy, halogen, and nitro providing such substituents do not inhibit azotization of the amino groups.

Typical examples of my invention are the following:

4.09 gms. (9.09 gms. 45% paste) (.01 M) diphenyl benzidine hydrochloride (Carwin Company) were tetrazotized in the usual manner using hydrochloric acid, water and sodium nitrite as the azotizing medium.

The azotized diamine was then coupled to a solution made up of 3.76 gms. (.02 M) beta hydroxy naphthoic acid, .8 gm. NaOH, 7.62 gms. soda ash, water and ice.

The resulting pigment, after stirring to allow completeness of coupling, was heated to 60° C., and then struck with a water solution of .06 M $CuSO_4 \cdot 5H_2O$; the whole was heated at near boil for one hour, filtered and washed.

The material was a pigment of a deep reddish purple color.

The typical precautionary measures useful in diazotization reactions should be observed, these varying of course with the particular amine. In coupling, I prefer to operate with the beta oxy naphthoic acid partially out of solution, as I find that improved results are obtained in more concentrated coupling solutions.

The copper probably couples by forming a complex between the phenolic hydroxyl and the carboxyl group. I find that about 10 to 15% excess of copper is desirable over that necessary to produce the theoretical equi-molar complex with the beta-oxy naphthoic acid (i. e. two mols of copper per mol of dyestuff). The coppering can take place in neutral or alkaline solutions (pH 7.0 or higher), the copper may be present as a simple salt, or as a complex such as the copper ammonium complex. In general, rather elevated temperates (60–100° C.) are necessary to insure complete coppering.

Obviously, many changes can be made in the specific examples without departing from the scope of the invention, which is defined in the claims.

I claim:

1. The method of making a pigment dyestuff, which comprises tetrazotizing a diamine of the formula:

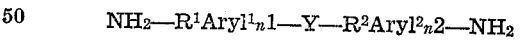

where $n^1$ and $n^2$ are numbers from 1 to 3, Y is a connecting member of the group consisting of a bond, oxygen, carbonyl and alkyl, and $R^1$ and $R^2$ are nuclei of the group consisting of benzene and naphthalene, coupling the tetrazo compound with beta hydroxy naphthoic acid, and coppering in substance the azo compound so produced.

2. As new pigment dyestuffs, compounds of the general formula:
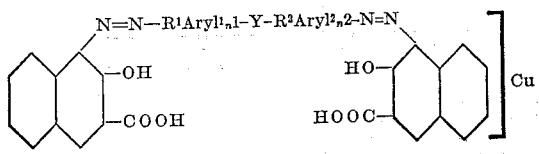
where $n^1$ and $n^2$ are numbers from 1 to 3, Y is a connecting member of the group consisting of a bond, oxygen, carbonyl and alkyl, and $R^1$ and $R^2$ are nuclei of the group consisting of benzene and naphthalene, in the form of finely divided water-insoluble pigment powders.
WILLIAM B. REYNOLDS.